C. W. P. HEYLANDT.
EXPANSION ENGINE FOR REDUCING COMPRESSED GAS TO LOW TEMPERATURES.
APPLICATION FILED JAN. 29, 1910.
1,019,791.
Patented Mar. 12, 1912.
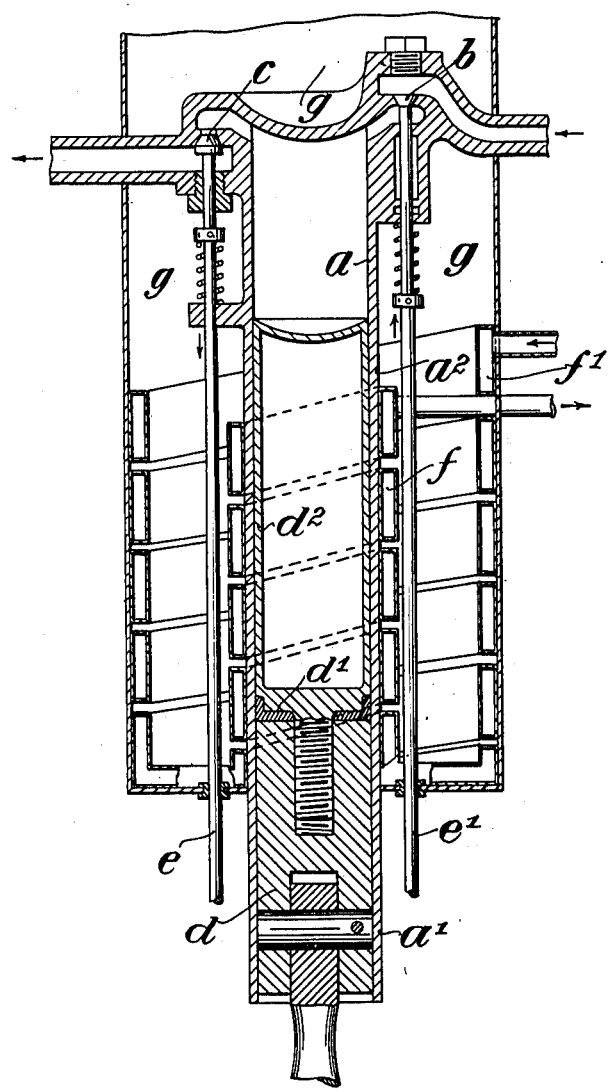
WITNESSES
INVENTOR
Christain W. P. Heylandt
BY his ATTORNEYS

UNITED STATES PATENT OFFICE.

CHRISTIAN WILHELM PAULUS HEYLANDT, OF HAMBURG, GERMANY.

EXPANSION-ENGINE FOR REDUCING COMPRESSED GAS TO LOW TEMPERATURES.

1,019,791.  Specification of Letters Patent.  Patented Mar. 12, 1912.

Application filed January 29, 1910. Serial No. 540,901.

*To all whom it may concern:*

Be it known that I, CHRISTIAN WILHELM PAULUS HEYLANDT, a subject of the Emperor of Germany, residing at Hamburg, in the Empire of Germany, have invented new and useful Improvements in Expansion-Engines for Reducing Compressed Gas to Low Temperatures, of which the following is a specification.

My invention relates to expansion engines, in which highly compressed gas is caused to expand while performing work, so that it cools down to a very low temperature.

The object of the invention is to substantially prevent the heat caused by the friction of the piston reaching the expanded gas and yet to prevent freezing in of the piston and trouble with lubrication by reason of the extreme cold.

My invention consists in improvements in such expansion engines, whereby the indicated defects are avoided and the operation of the machine is rendered exceedingly reliable.

One improvement consists in a long piston made in two portions secured together with a packing ring between them. One portion of the piston working in the cold sphere of the expanding gas is so fitted into the cylinder as to leave almost no annular space around it without, however, producing any friction. It comprises in its interior a space, which may either be filled up with a bad heat conductor, or form a vacuum chamber, from which the air has been exhausted. Owing to this construction of the said piston portion and also on account of the said packing ring the expanding volume of cold gas can not come in contact or become mixed with lubricants, such as oil, naphtha, gasolene, etc. The other portion of the piston is fitted to slide in the cylinder and requires to be lubricated like ordinary pistons. It serves also for centering the first mentioned portion, so as to prevent this from rubbing on the walls of the cylinder. To better insure this effect the cylinder is preferably placed vertically and the inlet and outlet valves for the compressed gas are disposed at the top of the cylinder.

Another improvement consists in a coil, through which is passed gas or air at ordinary temperature, surrounding the cylinder in the vicinity of the lubricated portions for recovering some of the cold that reaches there and thereby prevents the cylinder from cooling below a certain limit by giving heat to the cylinder so that in this manner the lower portion of the piston is surely prevented from freezing in and stopping.

I shall now proceed to explain the apparatus more in detail with the aid of the accompanying drawing showing a diagram of the piston, cylinder, and immediately related parts. The part $a$ represents a steel cylinder with thin walls, on which the admission valve $b$ and the exhaust valve $c$ are mounted. The piston $d$ moves in the cylinder $a$, into which it is very closely fitted. At a suitable point of the said piston, preferably at the point $d^1$, a tight packing ring has been provided. An extension of the piston $d$ is formed by the piston $d^2$, which without friction moves in the cylinder $a$, and is centered in its motion by the piston $d$. Piston $d^2$, however, is so constructed that there is no considerable annular space between the said piston and the cylinder $a$. Valve rods indicated by $e^1$ and $e$ are used for operating the valves $b$ and $c$. The conduits used for recovering the cold are indicated by $f$ and $f^1$.

In operating the engine as will be well understood compressed, purified, dry gas is admitted to the cylinder $a$ through the valve $b$ when the piston part $d^2$ is in the upper part of the cylinder. The downward motion of the piston after closing the inlet valve causes an ideal expansion of the compressed gas work being performed at the same time, and the obtainable reduction in temperature amounts for example to over 200° C., according to the ratio of pressure and the contents of the cylinder. While the piston is on its upward stroke the cold gas is exhausted through the valve $c$. The aforementioned large reduction in temperature is obtained partly on account of the fact that the piston part $d^2$ moves without friction in the cylinder $a$, the cold produced being consequently not diminished by heat generated by friction. Transmission of heat through the piston to the cold, expanded gas is reduced to a minimum by either creating a vacuum in the hollow piston $d^2$ or making it of a material which is a bad heat conductor. The side walls of the cylinder $a$ are made so thin that, although capable of withstanding the operating pressure, the cross section of the walls is so small that the heat can find its way to the cold part of the cylinder only to a very slight extent.

The compressed gas current to be treated in the expansion engine, before entering the channel leading to the admission valve $b$ is led into the conduit $f^1$ as shown by the arrow flows in the spirally wound coils of said conduit downward, is conducted over into the inner conduit $f$ and flowing there in an upward direction, thereby absorbing a part of the cold which passes through the wall of the cylinder $a$, so as to make it possible to utilize it again for the operation of the device in as much as the heat, owing to the compression of the gas flowing in the conduit, is transferred to the cylinder wall whereby the gas entering the admission valve $b$ by means of a pipe (not shown) connecting the outlet branch of the conduit $f$ with the channel leading to the admission pipe $b$, a temperature near to the ordinary temperature required is obtained. This arrangement thus offers a means of utilizing for cooling purposes the cold which unavoidably escapes in undercurrents of defects of insulation.

The free space $g$ between the cylinder $a$ and the coils $f$ surrounding it on one side and the outer wall surrounding the whole apparatus and the other coils $f^1$ is filled with insulating material. The sliding piston part $d$, with its tight packing ring $d^1$ operates, in consequence of the installation of the conduits $f$, at moderate temperature, and can consequently be lubricated with ordinary lubricants, and as its guide surface is not within the cold sphere, the cold gas does not get mixed or contaminated with the lubricating oil, an advantage which is also partly due to the vertical position of the device. The current of gases in the conduits $f$ and $f^1$, which are slightly cooled during their circulation, may be used for the preliminary cooling of other volumes of compressed gas. It is known that such preliminary cooling increases the efficiency of air liquefying machines (or gas liquefying machines).

The freezing in and consequent stopping of the apparatus are prevented by leaving only the end section of the piston, which operates without lubrication, exposed to the influence of the very low temperature, and by preventing the transmission of much cold to the sliding parts of the piston, which require lubrication, by insulating the said piston part by a vacuum, and by providing the piston, if necessary, with conduits which afford a means of recovering the escaping cold by transmitting it to gas currents, and of preventing the sliding piston from becoming cold.

What I claim is:—

1. An expansion engine for reducing compressed gas to low temperatures, the combination with a cylinder of two valves for one end of said cylinder, one for the inlet of compressed gas and the other for the outlet of cold expanded gas, a coil surrounding said cylinder at points remote from said end adapted for collecting cold leaking through said walls, a piston consisting of two portions, of which one working in the cold sphere of the expanded gas is a bad heating conductor and is so fitted into said cylinder as to move without substantial friction and the other portion is fitted to slide in said cylinder, and a packing ring for said piston substantially as set forth.

2. In an expansion engine for reducing compressed gas to low temperatures, the combination of a cylinder having thin walls, of two valves for one end of said cylinder, one for the inlet of compressed gas and the other for the outlet of cold expanded gas, a cold collection coil surrounding said cylinder, a piston consisting of two portions of which one working in the cold sphere of the expanding gas is adapted to form a bad heat conductor and is fitted within said cylinder so as to move without substantial friction and the other portion is adapted to slide in said cylinder, and a packing ring for the lower portion of said piston.

3. In an expansion engine for reducing compressed gas to low temperatures, the combination with a vertical cylinder of two valves for the top of said cylinder, one for the inlet of compressed gas and the other for the outlet of cold expanded gas, a cold absorbing coil surrounding said cylinder, a piston consisting of two portions, one working in the cold sphere of the expanding gas and adapted to form a poor heat conductor and fitting within said cylinder so as to move without substantial friction therewith, the other portion is fitted to slide in said cylinder and a packing ring between the two portions of said piston.

4. In an expansion engine for reducing compressed gas to low temperatures, the combination of a vertical cylinder having upright walls, of two valves for the top of said cylinder, one for the inlet of compressed gas and the other for the outlet of cold expanded gas, a cold absorbing coil surrounding said cylinder, a piston consisting of two portions, one forming a bad heat conductor adapted to move within said cylinder substantially without friction, the other being adapted to work within the first of said portions and within said cylinder, and a packing ring for said piston substantially as described and set forth.

5. In an expansion engine for reducing compressed gas to low temperature, the combination of a cylinder, inlet and outlet valves for one end of the cylinder, a piston having sliding contact with portions of said cylinder remote from said end, said piston having an extending portion which extends into the cold sphere of the cylinder and substantially insulates the sliding portion of the piston therefrom and means for transmitting cold from the portion of the cylinder with which said piston makes sliding contact.

In testimony whereof I have signed this specification in the presence of two subscribing witnesses.

CHRISTIAN WILHELM PAULUS HEYLANDT.

Witnesses:
  HENRY HASPER,
  WOLDEMAR HAUPT.